(12) United States Patent
Städele et al.

(10) Patent No.: US 11,034,141 B2
(45) Date of Patent: Jun. 15, 2021

(54) CORRUGATED CARDBOARD PLANT

(71) Applicant: BHS Corrugated Maschinen- und Anlagenbau GmbH, Weiherhammer (DE)

(72) Inventors: Norbert Städele, Parkstein (DE); Helmut Kraus, Wackersdorf (DE); Maximilian Mark, Tirschenreuth (DE)

(73) Assignee: BHS Corrugated Maschinen- und Anlagenbau GmbH, Weiherhammer (DE)

( * ) Notice: Subject to any disclaimer, the term of this patent is extended or adjusted under 35 U.S.C. 154(b) by 42 days.

(21) Appl. No.: 16/134,238

(22) Filed: Sep. 18, 2018

(65) Prior Publication Data
US 2019/0084288 A1 Mar. 21, 2019

(30) Foreign Application Priority Data

Sep. 21, 2017 (DE) ...................... 10 2017 216 718.1

(51) Int. Cl.
*B32B 39/00* (2006.01)
*B31F 1/28* (2006.01)
(Continued)

(52) U.S. Cl.
CPC ............ *B32B 39/00* (2013.01); *B31F 1/2822* (2013.01); *B32B 37/12* (2013.01); *B32B 37/20* (2013.01);
(Continued)

(58) Field of Classification Search
CPC ... B31F 1/20–32; B32B 38/145; B32B 39/00; B32B 2317/127; B32B 37/12; B32B 37/20; B32B 38/0004; B32B 38/1858
See application file for complete search history.

(56) References Cited

U.S. PATENT DOCUMENTS 3,712,843 A * 1/1973 Gartaganis ................ B31F 1/28
156/499
4,169,007 A 9/1979 Pray
(Continued)

FOREIGN PATENT DOCUMENTS

DE 34 32 587 A1 3/1986
DE 101 31 833 A1 1/2003
(Continued)

OTHER PUBLICATIONS

Machine translation of EP 0174423 date unknown.*

*Primary Examiner* — John L Goff, II
(74) *Attorney, Agent, or Firm* — McGlew and Tuttle, P.C.

(57) ABSTRACT

The invention relates to a corrugated cardboard plant. The corrugated cardboard plant comprises at least one device for producing a respective corrugated cardboard web laminated on one side, from a respective cover web and a respective material web; and a lamination web dispensing device for dispensing a lamination web; and a device for producing a corrugated cardboard web laminated on two sides from the at least one corrugated cardboard web laminated on one side and from the lamination web, said device for producing a corrugated cardboard web laminated on two sides being disposed downstream of the lamination web dispensing device and of the at least one device for producing a respective corrugated cardboard web laminated on one side. The corrugated cardboard plant furthermore has a printing assembly for printing the corrugated cardboard web laminated on two sides, said printing device for producing a corrugated cardboard web laminated on two sides being disposed downstream of the device for producing a corrugated cardboard web laminated on two sides.

22 Claims, 8 Drawing Sheets

(51) Int. Cl.
    *B32B 37/12*        (2006.01)
    *B32B 37/20*        (2006.01)
    *B32B 38/00*        (2006.01)

(52) U.S. Cl.
    CPC ........ *B32B 38/0004* (2013.01); *B32B 38/145*
        (2013.01); *B32B 2317/127* (2013.01)

(56) References Cited

U.S. PATENT DOCUMENTS

| | | |
|---|---|---|
| 4,603,654 A | 8/1986 | Mori et al. |
| 2003/0000988 A1 | 1/2003 | Ruhland et al. |
| 2004/0182503 A1* | 9/2004 | Stadele ................ B31F 1/2813 |
| | | 156/210 |
| 2004/0182504 A1 | 9/2004 | Stadele et al. |
| 2006/0060044 A1 | 3/2006 | Titz et al. |
| 2006/0225830 A1 | 10/2006 | Kohler |
| 2008/0002011 A1* | 1/2008 | Mizutani ............... B31F 1/2822 |
| | | 347/104 |
| 2011/0234724 A1* | 9/2011 | Hoover ................ B41J 25/3082 |
| | | 347/102 |
| 2011/0247746 A1 | 10/2011 | Schumacher et al. |
| 2013/0029825 A1 | 1/2013 | Rich |
| 2016/0361886 A1 | 12/2016 | Suzuki et al. |

FOREIGN PATENT DOCUMENTS

| | | |
|---|---|---|
| DE | 103 12 601 A1 | 9/2004 |
| DE | 20 2004 013 420 A1 | 10/2004 |
| DE | 10 2004 046 127 A1 | 4/2006 |
| EP | 0174423 A1 * 3/1986 | ............. B41F 13/14 |
| JP | 2017 001266 A | 1/2017 |

\* cited by examiner

CORRUGATED CARDBOARD PLANT

CROSS-REFERENCE TO RELATED APPLICATIONS

This application claims priority of German Patent Application, Serial No. DE 10 2017 216 718.1 filed on Sep. 21, 2017, pursuant to 35 U.S.C. 119(a)-(d), the content of which is incorporated herein by reference in its entirety as if fully set forth herein.

FIELD OF THE INVENTION

The invention relates to a corrugated cardboard plant for producing corrugated cardboard, and to a method for producing corrugated cardboard.

BACKGROUND OF THE INVENTION

Corrugated cardboard plants having printing assemblies are known from the prior art by way of the obvious prior use thereof. It is often disadvantageous in said corrugated cardboard plants that the printing quality of the latter is unsatisfactory. Such corrugated cardboard plants moreover have a large requirement in terms of space.

SUMMARY OF THE INVENTION

The invention is based on the object of providing a corrugated cardboard plant comprising a printing assembly, the printing quality of the latter being particularly high. Said corrugated cardboard plant is in particular intended to have a comparatively small requirement in terms of space. A respective production method is likewise to be provided.

This object is achieved according to the invention by a corrugated cardboard plant for producing corrugated cardboard, comprising at least one device for producing a respective corrugated cardboard web laminated on one side, from a respective cover web and a respective material web; a lamination web dispensing device for dispensing a lamination web; a device for producing a corrugated cardboard web laminated on two sides from the at least one corrugated cardboard web laminated on one side and from the lamination web, said device for producing a corrugated cardboard web laminated on two sides being disposed downstream of the lamination web dispensing device and of the at least one device for producing a respective corrugated cardboard web laminated on one side, and having at least one compression section; a printing assembly having at least one digital printing device for printing the corrugated cardboard web laminated on two sides, said printing assembly for producing a corrugated cardboard web laminated on two sides being disposed downstream of the device for producing a corrugated cardboard web laminated on two sides; a traction assembly for influencing a web tension of the corrugated cardboard web laminated on two sides in the printing assembly, said traction assembly being disposed so as to be adjacent to the at least one digital printing device; and a transverse cutting device disposed downstream of the printing assembly, for transversely cutting the corrugated cardboard web laminated on two sides, while forming corrugated cardboard sheets.

Furthermore, this object is achieved according to the invention by a method for producing corrugated cardboard, comprising the step of applying glue by means of a gluing unit to free tips of at least one corrugated cardboard web laminated on one side for connecting the latter in a glued manner to a further web for forming a corrugated cardboard web laminated on two sides, wherein the glue permits processing temperatures of below 70° C., said temperatures favourably being present at least on the at least one corrugated cardboard web laminated on one side and/or on the lamination web.

The core concept of the corrugated cardboard plant according to the invention lies in that the quasi completely configured corrugated cardboard web laminated on two sides/both sides is printed, said corrugated cardboard web in particular being conveyed and preferably being continuous. This is advantageous inter alia for reasons of vibrations. The corrugated cardboard web laminated on two sides has at least three plies, such as three plies, five plies, or seven plies. Said corrugated cardboard web on the external sides has two non-corrugated or smooth webs, respectively, that lie opposite one another.

The traction assembly ensures a particularly positive handling of the corrugated cardboard web laminated on two sides in the printing assembly, or adjacent to the at least one digital printing device, this having a positive effect on the printing quality. In particular, the corrugated cardboard web laminated on two sides is thus particularly well placeable under tensile stress in the printing assembly, or so as to be adjacent to the at least one digital printing device, respectively. The tensile stress is preferably adjustable.

It has surprisingly been demonstrated that imprinting the corrugated cardboard web laminated on two sides leads to significantly better printing results than imprinting individual corrugated cardboard sheets. This above all can be traced back to the conveyed corrugated cardboard web laminated on two sides being more readily capable of being tensioned or placed under tension, respectively, than conveyed corrugated cardboard sheets. In the case of the corrugated cardboard web laminated on two sides being configured in a continuous manner, disturbances in the printing assembly are preventable in a particularly effective manner A corrugated cardboard web of this type naturally does not have any leading or trailing abutting edges, respectively, which make contact in the printing assembly, for example, and thus could lead to damage to the printing assembly or to jamming, respectively.

The corrugated cardboard web laminated on two sides in the printing assembly is favourably imprinted on at least one of the external sides of said corrugated cardboard web, said at least one external side then forming a printed side. In particular, the cover web is printed favourably from above by the at least one digital printing device, said cover web in the corrugated cardboard web laminated on two sides being disposed so as to be opposite a lamination web. It is advantageous for an already printed lamination web to be used, or for the lamination web to be printed in the corrugated cardboard plant. The printing assembly, or the at least one digital printing device, respectively, when imprinting, or when drying the imprint, respectively, favourably heats the corrugated cardboard web laminated on two sides at least in portions to a maximum of 120° C., more preferably to 50° C. to 70° C. Said printing assembly, or said at least one digital printing device, respectively, preferably has at least one dedicated heating element.

The at least one digital printing device is in particular an inkjet printing device. Alternatively, other known printing devices, or other printing methods, respectively, can be used.

The at least one digital printing device is in particular capable of imprinting at least one alphabetic letter, a numeral, or any other sign, a graph and/or a photograph on the corrugated cardboard web laminated on two sides. A paint or printing ink, respectively, is favourably used to this end.

It is expedient for the at least one digital printing device to have at least one printing head. The at least one digital printing device favourably has a plurality of printing heads which are disposed in a cascading manner in a width direction or transverse direction, respectively, of the corrugated cardboard web laminated on two sides. It is advantageous for the at least one digital printing device to have a plurality of printing heads, favourably for different colours, said printing heads being disposed in rows behind one another in a conveying direction of the corrugated cardboard plant.

It is advantageous for a drying device for drying a generated imprint, or the corrugated cardboard web laminated on two sides, respectively, to be disposed downstream of the at least one digital printing device. A pre-coating assembly is favourably disposed upstream of said digital printing device.

The printing assembly is favourably retro-fittable.

The at least one device for producing a respective corrugated cardboard web laminated on one side favourably comprises a respective grooving installation for grooving the material web to be corrugated, while forming a corrugated web.

It is advantageous when the at least one device for producing a respective corrugated cardboard web laminated on one side has a respective glue application installation for gluing the corrugated web.

It is expedient for the at least one device for producing a respective corrugated cardboard web laminated on one side to moreover comprise a respective contact pressure installation for pressing the cover web against the corrugated web provided with glue.

A respective cover web dispensing device and a respective material web dispensing device are preferably disposed upstream of the device for producing a respective corrugated cardboard web laminated on one side. The cover web dispensing device and/or the material web dispensing device are/is favourably configured as a splicing device.

It is advantageous for the lamination web dispensing device to be a splicing device for dispensing a continuous, in particular printed, lamination web.

The device for producing a corrugated cardboard web laminated on two sides has at least one compression section, or at least one compression gap, respectively. The at least one compression section, or the at least one compression gap, respectively, is favourably formed or delimited, respectively, by at least two, in particular drivable, compression rollers or compression belts, respectively, that are disposed in pairs. The compression belts are preferably continuous.

The corrugated cardboard web laminated on two sides is guided through the at least one compression gap, or the at least one compression section, respectively, wherein the webs thereof for interconnecting in a glued manner are pressed against one another.

The transverse cutting device favourably has two rotatably drivable transverse cutting rollers disposed on top of one another that have transverse cutting blades that extend radially outwards.

The terms "disposed upstream", "disposed downstream", "upstream", "downstream", "behind one another" or the like used here refer in particular to the conveying direction of the respective conveyed web.

The processing temperatures of the glue of below 70° C. as claimed in the method for producing corrugated cardboard lead to particularly little energy being required in order for the corrugated cardboard to be produced. Furthermore, the webs to be glued, or to be interconnected, respectively, are treated in a gentle manner. The glue has a comparatively low bonding temperature or curing temperature, respectively.

Bonding or curing, respectively, of the glue is performed in particular when the latter is applied to the at least one corrugated cardboard web laminated on one side, or immediately thereafter, respectively, the glue receptacle region of said corrugated cardboard web preferably having a temperature which is sufficient for the glue to bond, cure, or dry, respectively. Regions of the glue, or glue lines, respectively, therein are favourably imparted temperatures of below 70° C. when the glue is applied as well as thereafter.

The gluing unit can also be the subject matter of an independent inventive subject matter.

The first traction device disposed upstream of the at least one digital printing device and the second traction device disposed downstream of the at least one digital printing device are favourably adjustable or activatable, respectively, in a mutually independent manner. The corrugated cardboard web laminated on two sides is thus favourably sufficiently tensioned in the printing assembly, or so as to be adjacent to the at least one digital printing device, respectively, and is thus smooth. It is expedient for the printing assembly or the at least one digital printing device, respectively, to be disposed between the first traction device and the second traction device.

The at least one traction element comprising at least one drivable traction element and at least one counter element that is assigned to the former so as to delimit at least one traction gap for guiding therebetween the corrugated cardboard web laminated on two sides is favourably drivable in a rotating manner Said traction element is embodied as a roller, a belt, or the like, for example.

The at least one counter element is preferably drivable in a rotating manner. It is advantageous for the at least one counter element to be embodied as a roller, a belt, or the like. Alternatively, the at least one counter element is static, for example. Said counter element in this instance is embodied as a table.

It is advantageous for the corrugated cardboard web laminated on two sides to undergo compression in the at least one traction gap. The corrugated cardboard web laminated on two sides is in particular compressed in the direction of the thickness thereof in said traction gap. The web tension of the corrugated cardboard web laminated on two sides is thus capable of being influenced in a particularly functionally reliable manner.

The longitudinal cutting/grooving device, which is disposed downstream of the printing assembly, for longitudinally cutting and/or grooving the corrugated cardboard web laminated on two sides preferably comprises at least one longitudinal cutting unit and at least one grooving unit.

It is expedient for the short transverse cutting devices disposed upstream of the printing assembly and downstream of the printing assembly, respectively, to have a knife cylinder and a counter cylinder assigned thereto. The short transverse cutting device is favourably capable of generating a cut which extends across the full width of the corrugated cardboard web laminated on two sides. To this end, the knife cylinder and the counter cylinder are preferably set in rotation in such a manner that said knife cylinder and said counter cylinder interact in the cutting procedure. The short transverse cutting device is furthermore capable of generating a cut of a specific length and having a specific spacing from a periphery of the corrugated cardboard web laminated on two sides. To this end, counter-member elements are chosen or adjusted in a corresponding manner, respectively. The knife cylinder and the counter cylinder are set in motion for the cutting procedure in such a manner that a knife of the knife cylinder interacts with the counter-member elements.

The design embodiment configured such that a short transverse cutting device is disposed downstream of the printing assembly permits defective (webs of) corrugated cardboard to be diverted prior to printing, this safeguarding the printing assembly.

The imprint synchronization assembly of the printing assembly for synchronizing imprinting by the at least one digital printing device with the corrugated cardboard web laminated on two sides, wherein the imprint synchronization assembly preferably comprises at least one reader assembly for reading synchronization information on the corrugated cardboard web laminated on two sides, ensures a particularly high corrugated cardboard quality. The imprint and the corrugated cardboard web laminated on two sides are thus in particular capable of being adapted to one another, or of being synchronized, respectively, in particular in a mechanized or automatic manner, respectively. The imprint by the at least one digital printing device is in particular capable of being adapted to, or of being synchronized with, respectively, an imprint that is already present on the lamination web in a particularly simple and functionally reliable manner A corrugated cardboard web laminated on two sides that is printed to an exact match on both sides is thus able to be obtained in a reliable manner.

It is advantageous for the synchronization information, or the positioning information, respectively, on the corrugated cardboard web laminated on two sides to be imprinted externally onto an external web of the subsequent corrugated cardboard web laminated on two sides. Alternatively, the synchronization information, or the positioning information, respectively, has already been applied to such a web outside the corrugated cardboard plant. It is advantageous for the synchronization information, or the positioning information, respectively, to be located on the lamination web.

The synchronization information, or the positioning information, respectively, is favourably marks such as printing marks, cutting marks, and/or gusset marks, and/or codes such as uni-dimensional or two-dimensional codes.

The at least one reader assembly for reading the synchronization information, or positioning information, respectively, preferably comprises at least one optical reading head and/or at least one camera such as a smart camera and/or a line scan camera.

The at least one reader assembly detects in particular synchronization information, or positioning information, respectively, for positioning the imprint in and/or counter to the conveying direction of the corrugated cardboard web laminated on two sides. The at least one reader assembly favourably detects synchronization information, or positioning information, respectively, also for positioning the imprint perpendicularly to the conveying direction of the corrugated cardboard web laminated on two sides.

It is advantageous for the at least one reader assembly to be disposed upstream of the at least one digital printing device. The at least one reader assembly is favourably disposed downstream of the at least one compression section. Said reader assembly is preferably disposed so as to be upstream of the longitudinal cutting/grooving device. A high mutual precision of the cover web and of the lamination web is thus possible.

The design embodiment configured such that the printing assembly has a web speed measuring device for measuring a conveying speed of the corrugated cardboard web laminated on two sides, wherein the web speed measuring device is disposed upstream of the at least one digital printing device and in particular is disposed so as to be adjacent to said digital printing device, and is in signal communication with an activation unit for synchronizing imprinting by the at least one digital printing device with the corrugated cardboard web laminated on two sides also results in a particularly high corrugated cardboard quality. The web speed measuring device favourably operates in a non-contacting manner, preferably in an optical manner, preferably by means of a laser. The signal connection between the web speed measuring device and the activation unit can be wireless or wired. The activation unit is preferably of the electronic type. It is advantageous for the activation unit to be embodied as an open-circuit and/or closed-circuit control unit. The web speed measuring device is a component part of the imprint synchronization assembly, for example.

A spacing between the web speed measuring device and the at least one digital printing device is favourably known and smaller than 1 m. It is expedient for tracking of the marks across the web speed measuring device and intelligence pertaining to a distance between the reader assembly and the at least one digital printing device to be established.

The printing assembly comprising a vacuum guiding device for guiding the corrugated cardboard web laminated on two sides favourably has a dedicated vacuum guiding device which by means of a vacuum or negative pressure, respectively, holds the conveyed corrugated cardboard web laminated on two sides on at least one guiding face. The vacuum guiding device preferably extends so as to be at least adjacent to the at least one digital printing device. A particularly high printing quality is achievable on account of the guided corrugated cardboard web laminated on two sides. A pre-determined profile of the corrugated cardboard web in the printing assembly is thus guaranteed in particular.

The at least one heating installation of the vacuum guiding device for heating the corrugated cardboard web laminated on two sides likewise leads to a particularly high printing quality. It is advantageous for the at least one heating installation to be disposed in an upstream region of the vacuum guiding device. Said heating installation is preferably disposed so as to be downstream of the at least one digital printing device. Said heating installation preferably has at least one metallic heating element that is heatable by means of steam.

The at least one guide table of the vacuum guiding device for guiding the corrugated cardboard web laminated on two sides favourably has a solid, fixed guiding face for guiding or supporting, respectively, the corrugated cardboard web laminated on two sides in an in particular accurate manner. Alternatively or additionally, at least one vacuum strip for guiding the corrugated cardboard web laminated on two sides is present.

The corrugated cardboard web laminated on two sides that is suctioned to the at least one guide table by means of the at least one suction opening in the guiding face of the at least one guide table is guided in a particularly reliable or tight manner, respectively, while being conveyed on the at least one guide table, this leading to a particularly high printing quality.

The design embodiment configured such that the at least one guide table has a guiding face which for facilitating a compression of the corrugated cardboard web laminated on two sides against the at least one guide table is curved at least in regions, wherein a curvature radius of the curved guiding face is preferably at least 2.5 metres, more preferably at least 5 metres, also results in a particularly high printing quality. The corrugated cardboard web laminated on two sides while being imprinted is guided in a particularly reliable or tight manner, respectively, on the at least one guide table. The at least one guide table in relation to the conveying direction of the corrugated cardboard web laminated on two sides in the printing assembly is favourably curved in a concave and/or convex manner.

The design embodiment configured such that the at least one digital printing device is displaceable, in particular in a guided manner, between a printing position and a parking position, wherein the parking position is preferably laterally beside the corrugated cardboard web laminated on two sides, is particularly user friendly. For example, the at least one digital printing device in a threading procedure of the corrugated cardboard web laminated on two sides is displaceable to the parking position of said digital printing device. Maintenance or defect-correction jobs, respectively, are thus also able to be carried out in an extremely positive manner when the at least one digital printing device is located in the parking position thereof. The at least one digital printing device in a printing procedure is located in the printing position of the former, in particular so as to be adjacent to the corrugated cardboard web laminated on two sides. To this end, it is advantageous for the at least one digital printing device to be mounted in a pivotable and/or displaceable manner.

The design embodiment comprising a pre-coating assembly for pre-coating the web to be printed, wherein the pre-coating assembly is disposed upstream of the device for producing a respective corrugated cardboard web laminated on one side having the pre-coated web, leads to a corrugated cardboard plant which has a comparatively small requirement in terms of space. The pre-coating assembly comprises a pre-coating application device and preferably also a drying device and/or a cooling device. It is advantageous for the device for producing a corrugated cardboard web laminated on two sides to comprise an integrated traction device for influencing a web tension of the corrugated cardboard web laminated on two sides in the printing assembly. The traction device in this instance is formed by the at least one compression belt of the device for producing a corrugated cardboard web laminated on two sides.

The peripheral trimming device disposed upstream of the at least one printing device, for trimming the edges of the corrugated cardboard web laminated on two sides favourably severs longitudinal peripheral regions of the corrugated cardboard web laminated on two sides that have not been adhesively bonded. It can thus be reliable prevented that (peripheral) regions of the corrugated cardboard web laminated on two sides that have not been adhesively bonded make their way to the at least one digital printing device and are thus capable of damaging the latter.

It is advantageous for a readjustment of the at least one longitudinal cutting unit and/or grooving unit transversely to a conveying direction of the corrugated cardboard web laminated on two sides to be performed depending on at least one peripheral trim by the peripheral trimming device, or on at least one peripheral trimming position, respectively.

A position detection of the at least one peripheral trim is performed, for example, by way of a print layout detection, or a print layout monitor, respectively.

The print layout detection assembly for activating the longitudinal cutting/grooving device, said print layout detection assembly being disposed between the longitudinal cutting/grooving device and the peripheral trimming device, detects the printed regions or print layouts that are imprinted on the corrugated cardboard web laminated on two sides by the printing assembly. Said print layout detection assembly actuates the longitudinal cutting/grooving device in a corresponding manner, this leading to particularly precise longitudinal cutting or grooving, respectively, of the corrugated cardboard web laminated on two sides beside the printed regions or print layouts, respectively.

The design embodiments discussed above can also relate to preferred refinements of the method according to the invention for producing corrugated cardboard.

Preferred embodiments of the invention will be described in an exemplary manner hereunder with reference to the appended drawing.

DESCRIPTION OF THE PREFERRED EMBODIMENTS

Figure 1:
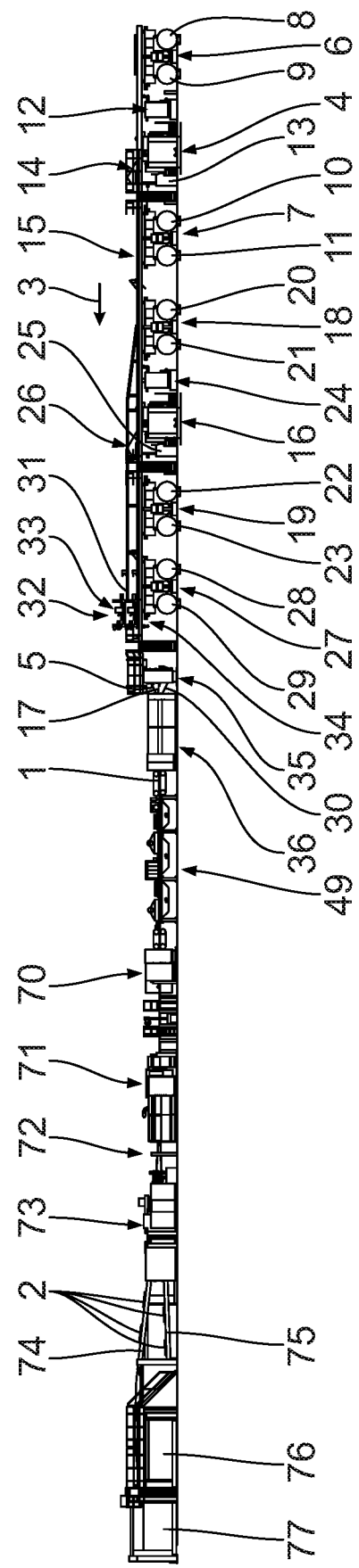
FIG. 1 shows a schematic lateral view of a corrugated cardboard plant according to the invention.

A corrugated cardboard plant shown in its entirety in FIG. 1 is capable of producing a continuous five-ply corrugated cardboard web 1, or five-ply corrugated cardboard sheets, 2, respectively. The corrugated cardboard plant overall is embodied in a longitudinal manner Said corrugated cardboard plant extends substantially in a longitudinal direction or conveying direction 3, respectively.

The corrugated cardboard plant comprises a first device 4 for producing a first corrugated cardboard web 5 laminated on one side.

A first cover web splicing device 6 and a first material web splicing device 7 are disposed upstream of the first device 4 for producing a corrugated cardboard web 5 laminated on one side.

The first cover web splicing device 6 comprises a first unwinding unit for unwinding a finite first cover web from a first cover web roll 8, and a second unwinding unit for unwinding a finite second cover web from a second cover web roll 9. The finite first cover web and the finite second cover web are connected to one another in the first cover web splicing device 6 in order for a continuous first cover web to be provided.

The first material web splicing device 7 is configured in a manner corresponding to that of the first cover web splicing device 6. Said first material web splicing device 7 comprises a third unwinding unit for unwinding a finite first material web from a first material web roll 10, and a fourth unwinding unit for unwinding a finite second material web from a second material web roll 11. The finite first material web and the finite second material web are connected to one another in the first material web splicing device 7 in order for a continuous first material web to be provided.

The continuous first cover web is fed to the first device 4 for producing a first corrugated cardboard web 5 laminated on one side by way of a first heating assembly 12, while the continuous first material web is fed to the first device 4 for producing a first corrugated cardboard web 5 laminated on one side by way of a first deflection assembly.

The first device 4 for producing a first corrugated cardboard web 5 laminated on one side, for generating a continuous first corrugated web having a corrugation from the continuous first material web, comprises a rotatably mounted first grooving roller and a rotatably mounted second grooving roller. The grooving rollers configure a first roller gap for guiding through and grooving the continuous first material web. Said grooving rollers conjointly form a first grooving assembly.

In order for the continuous first corrugated web to be connected to the continuous first cover web so as to form the first corrugated cardboard web 5 laminated on one side, the first device 4 for producing a first corrugated cardboard web 5 laminated on one side has a first glue application installation which comprises a first glue metering roller, a first glue container, and a first glue application roller. The first glue application roller, conjointly with the first grooving roller, configures a first gap for guiding through and gluing the continuous first corrugated web. The glue located in the first glue container is applied to tips of the corrugation of the continuous first corrugated web by way of the first glue application roller. The first glue metering roller bears on the first glue application roller and serves for configuring a uniform glue layer on the first glue application roller.

In the first device 4 for producing a first corrugated cardboard web 5 laminated on one side the continuous first cover web is subsequently joined to the continuous first corrugated web provided with glue from the first glue container.

In order for the continuous first cover web to be pressed against the continuous first corrugated web provided with glue, the latter web in turn in regions bearing on the first grooving roller, the first device 4 for producing a first corrugated cardboard web 5 laminated on one side has a first contact pressure module. The first contact pressure module is favourably embodied as a contact pressure belt module. Said first contact pressure module is disposed above the first grooving roller. The first contact pressure module has two first deflection rollers and a continuous first contact pressure belt which is guided around the two first deflection rollers.

The first grooving roller in regions engages from below in a space that is present between the two first deflection rollers, on account of which the first contact pressure belt is deflected by the first grooving roller. The first contact pressure belt presses against the continuous first cover web which in turn is pressed against the continuous first corrugated web that is provided with glue and bears on the first grooving roller.

In order for the first corrugated cardboard web 5 laminated on the one side to be conveyed further, said first corrugated cardboard web 5 laminated on one side is fed to a gantry 15 of the corrugated cardboard plant by way of a first elevated transportation installation 14. The gantry 15 can also serve for the intermediate storage and buffer storage of the first corrugated cardboard web 5 laminated on one side.

The corrugated cardboard plant moreover comprises a second device 16 for producing a second corrugated cardboard web 17 laminated on one side.

A second cover web splicing device 18 and a second material web splicing device 19 are disposed upstream of the second device 16 for producing a second corrugated cardboard web 17 laminated on one side.

The second cover web splicing device 18 is configured in a manner corresponding to that of the first cover web splicing device 6. Said second cover web splicing device 18 comprises a fifth unwinding unit for unwinding a finite third cover web from a third cover web roll 20, and a sixth unwinding unit for unwinding a finite fourth cover web from a fourth cover web roll 21. The finite third cover web and fourth cover web are connected to one another in the second cover web splicing device 18 in order for a continuous second cover web to be provided.

The second material web splicing device 19 is configured in a manner corresponding to that of the first material web splicing device 7. Said second material web splicing device 19 comprises a seventh unwinding unit for unwinding a finite third material web from a third material web roll 22, and an eighth unwinding unit for unwinding a finite fourth material web from a fourth material web roll 23. The finite third material web and fourth material web are connected to one another in the second material web splicing device 19 in order for a continuous second material web to be provided.

The continuous second cover web is fed to the second device 16 for producing a second corrugated cardboard web 17 laminated on one side by way of a second heating assembly 24, while the continuous second material web is fed to the second device 16 for producing a second corrugated cardboard web 17 laminated on one side by way of a second deflection assembly 25.

The second device 16 for producing a second corrugated cardboard web 17 laminated on one side is configured in a manner corresponding to that of the first device 4 for producing a first corrugated cardboard web 5 laminated on one side. Said second device 16 for producing a second corrugated cardboard web 5 laminated on one side, for generating a continuous second corrugated web having a corrugation from the continuous second material web, comprises a rotatably mounted third grooving roller and a rotatably mounted fourth grooving roller. The grooving rollers configure a second roller gap for guiding through and grooving the continuous second material web. Said grooving rollers conjointly form a second grooving assembly.

In order for the continuous second corrugated web to be connected to the continuous second cover web so as to form the second corrugated cardboard web 17 laminated on one side, the second device 16 for producing a second corrugated cardboard web 17 laminated on one side has a second glue application installation which comprises a second glue metering roller, a second glue container, and a second glue application roller. The second glue application roller, conjointly with the third grooving roller, configures a second gap for guiding through and gluing the continuous second corrugated web. The glue located in the second glue container is applied to tips of the corrugation of the continuous second corrugated web by way of the second glue application roller. The second glue metering roller bears on the second glue application roller and serves for configuring a uniform glue layer on the second glue application roller.

The continuous second cover web in the second device 16 for producing a second corrugated cardboard web 17 laminated on one side is subsequently joined to the continuous second corrugated web provided with glue from the second glue container.

In order for the continuous second cover web to be pressed against the continuous second corrugated web provided with glue, the latter web in turn in regions bearing on the third grooving roller, the second device 16 for producing a second corrugated cardboard web 17 laminated on one side has a second contact pressure module. The second contact pressure module is favourably embodied as a contact pressure belt module. Said second contact pressure module is disposed above the third grooving roller. The second contact pressure module has two second deflection rollers and a continuous second contact pressure belt which is guided around the two second deflection rollers.

The third grooving roller in regions engages from below in a space that is present between the two second deflection rollers, on account of which the second contact pressure belt is deflected by the third grooving roller. The second contact pressure belt presses against the continuous second cover web which in turn is pressed against the continuous second corrugated web that is provided with glue and bears on the third grooving roller.

In order for the second corrugated cardboard web 17 laminated on one side to be conveyed further, said second corrugated cardboard web 17 laminated on one side is fed to the gantry 15 by way of a second elevated transportation installation 26. The gantry 15 can also serve for the intermediate storage and buffer storage of the second corrugated cardboard web 17 laminated on one side.

The corrugated cardboard plant furthermore has a lamination web splicing device 27 which is configured like the other splicing devices 6, 7, 18, and 19, respectively. The lamination web splicing device 27 comprises a ninth unwinding unit for unwinding a finite first lamination web from a first lamination web roll 28, and a tenth unwinding unit for unwinding a finite second lamination web from a second lamination web roll 29. The finite first lamination web and the finite second lamination web are connected to one another in the lamination web splicing device 27 in order for a continuous lamination web to be provided. The continuous lamination web 30 is single ply and is already printed.

A web run correction assembly 32 is disposed in a downstream end region 31 of the gantry 15. The web run correction assembly 32 is disposed above the lamination web splicing device 27. Said web run correction assembly 32 comprises a first web run correction device 33, assigned to the first corrugated cardboard web 5 laminated on one side, and a second web run correction device 34, assigned to the second corrugated cardboard web 17 laminated on one side. The first web run correction device 33 is capable of influencing a web run of the first corrugated cardboard web 5 laminated on one side, or to cause a transverse deflection of the latter, respectively. The second web run correction device 34 is capable of influencing a web run of the second corrugated cardboard web 17 laminated on one side, or to cause a transverse deflection of the latter, respectively.

A gluing unit 35 of the corrugated cardboard plant is disposed downstream of the web run correction assembly 32 and of the lamination web splicing device 27. The gluing unit 35 is in particular directly after the gantry 15 and the lamination web splicing device 27. A horizontal spacing between the lamination web splicing device 27 and the gluing unit 35 is preferably extremely minor, in particular smaller than 5 metres. A pre-heating assembly is in particular absent, said pre-heating device otherwise being disposed upstream of the gluing unit 35, as is known, so as to pre-heat the corrugated cardboard webs 5, 17 laminated on one side and the continuous lamination web 30, prior to said webs being glued or adhesively bonded to one another, respectively.

The gluing unit 35 has a first gluing roller which is partially submerged in a first glue bath. The first corrugated cardboard web 5 laminated on one side, by way of the corrugated web thereof, is in contact with the first gluing roller and is thus provided with glue from the first glue bath. A first metering roller bears peripherally on the first gluing roller so as to configure a uniform glue film on the first gluing roller.

The gluing unit 35 furthermore has a second gluing roller which is partially submerged in a second glue bath. The second corrugated cardboard web 17 laminated on one side, by way of the corrugated web thereof, is in contact with the second gluing roller and is thus provided with glue from the second glue bath. A second metering roller bears peripherally on the second gluing roller so as to configure a uniform glue film on the second gluing roller.

The continuous lamination web 30 in the gluing unit 35 runs below the corrugated cardboard webs 5, 17 laminated on one side.

A glue which permits processing temperatures below 70° C. is used in the gluing unit 35.

The corrugated cardboard plant, upstream of the gluing unit 35, has a compression device 36 which comprises an upper compression belt that is guided over upper guide rollers, and a lower compression belt that is guided over lower guide rollers. A lower belt of the upper compression belt and an upper belt of the lower compression belt run in a horizontal and mutually adjacent manner Said lower belt of the upper compression belt and said upper belt of the lower compression belt configure a compression section. The glued corrugated cardboard webs 5, 17 laminated on one side and the continuous lamination web 30 are guided through the compression section. The continuous corrugated cardboard web 1 which is laminated on two sides and has a total of five plies is formed in the compression device 36. The compression device 36 thus forms a device for producing a corrugated cardboard web 1 laminated on two sides. The guide rollers run in the width direction of the corrugated cardboard web 1 laminated on two sides.

The corrugated cardboard plant, downstream of the gluing unit 35, has a first traction device 37 having a first traction installation 38 and a second traction installation 39, the latter being disposed so as to be adjacent to the first traction installation 38 and conjointly with the latter configuring a first traction gap 40.

The first traction installation 38 comprises two first guide rollers 41 which are disposed so as to be spaced apart in the conveying direction 3 of the corrugated cardboard plant, and a first traction belt 42 that is guided around the first guide rollers 41. The guide rollers 41 run perpendicularly to the conveying direction 3, or to a width direction of the corrugated cardboard web 1 laminated on two sides, respectively. At least one of the first guide rollers 41 is drivable in a rotating manner.

The second traction installation 39 is embodied in a manner corresponding to that of the first traction installation

38. Said second traction installation 39 is disposed below the first traction installation 38 and comprises two second guide rollers 43 which are disposed so as to be spaced apart in the conveying direction 3 of the corrugated cardboard plant, and a second traction belt 44 that is guided around the second guide rollers 43. The second guide rollers 43 extend perpendicularly to the conveying direction 3, or to a width direction of the corrugated cardboard web 1 laminated on two sides, respectively. At least one of the second guide rollers 43 is drivable in a rotating manner.

The first traction belt 42 has a first lower belt 45 which extends along the conveying direction 3 and moves along the latter. The second traction belt 44 has a second upper belt 46 which extends along the conveying direction 3 and so as to be adjacent to the first lower belt 45. The second upper belt 46 moves along the conveying direction 3. The first lower belt 45 and the second upper belt 46 run so as to be mutually adjacent and spaced apart, while delimiting the first traction gap 40.

The corrugated cardboard web 1 laminated on two sides is guided through the first traction gap 40. The first traction belt 42 and the second traction belt 44 in said traction gap 40 engage in an opposite manner on the corrugated cardboard web 1 laminated on two sides and compress the latter. The first traction device 37 can facilitate a conveyance of the corrugated cardboard web 1 laminated on two sides in the conveying direction 3, this subsequently causing a reduction in the web tension of the corrugated cardboard web 1 laminated on two sides. Said first traction device 37 can also apply a braking torque or a braking force, respectively, to the corrugated cardboard web 1 laminated on two sides, this subsequently causing an increase in the web tension of the corrugated cardboard web 1 laminated on two sides.

The corrugated cardboard plant, downstream of the first traction device 37, has an inspection assembly 47 which inspects the corrugated cardboard web 1 laminated on two sides for faults in particular on the external side, or printed side 48, respectively, of said corrugated cardboard web 1 laminated on two sides. The external side 48 is favourably turned upwards, so as to face away from the continuous lamination web 30. Said external side 48 is present on the external continuous cover web. An inspection by sensors is performed in terms of planarity or smoothness, for example. The inspection assembly 47 is disposed above the corrugated cardboard web 1 laminated on one side.

The corrugated cardboard plant, downstream of the inspection assembly 47, has a printing assembly 49.

The printing assembly 49 has a pre-coating application device 50 which is disposed downstream of the inspection assembly 47 and in terms of the printing assembly 49 is disposed at the entry side. The pre-coating application device 50 is disposed above the corrugated cardboard web 1 laminated on one side, and is capable of applying a planar pre-coating to the external side 48 of the corrugated cardboard web 1 laminated on two sides. To this end, the pre-coating application device 50 favourably utilizes at least one pre-coating roller which extends horizontally and perpendicularly to the conveying direction 3 of the corrugated cardboard web 1 laminated on both sides. The at least one pre-coating roller is preferably submerged in a precoating means that is capable of being applied.

The printing assembly 49 moreover has a first infrared drying device 51 which is disposed downstream of the pre-coating application device 50 and so as to be above the corrugated cardboard web 1 laminated on two sides. The first infrared drying device 51 extends horizontally and dries the precoated corrugated cardboard web 1 laminated on two sides, or the pre-coating of the latter, respectively, by means of infrared radiation. Said first infrared drying device 51 is preferably also capable of drying the glue in the corrugated cardboard web 1 laminated on two sides that has been applied by the glue unit 35. The first infrared drying device 51 is disposed so as to be adjacent to the corrugated cardboard web 1 laminated on two sides.

A first hot air drying device 52 of the printing assembly 49 is disposed downstream of the first infrared drying device 51, said first hot air drying device 52 being assigned to the corrugated cardboard web 1 laminated on two sides, so as to further dry the already somewhat dried corrugated cardboard web 1 laminated on two sides, or to further dry the already somewhat dried pre-coating of said corrugated cardboard web 1 laminated on two sides, respectively, with hot air. The first hot air drying device 52 is preferably also capable of drying the glue in the corrugated cardboard web 1 laminated on two sides that has been applied by the glue unit 35. Said first hot air drying device 52 extends horizontally and is directly downstream of the first infrared drying device 51.

The printing assembly 49 moreover has a first cooling device 53 which is disposed downstream of the hot air drying device 52 and is assigned to the corrugated cardboard web 1 laminated on two sides. The cooling device 53 is disposed above the corrugated cardboard web 1 laminated on two sides. Said cooling device 53 cools the corrugated cardboard web 1 laminated on two sides, or the already dried pre-coating, respectively.

The pre-coating application device 50, the first infrared drying device 51, the first hot air drying device 52, and the cooling device 53 preferably form a pre-coating assembly of the printing assembly 49.

The printing assembly 49 furthermore has a speed measuring device 54 which is assigned to the corrugated cardboard web 1 laminated on two sides and is disposed above the latter. The speed measuring device 54 therein is capable of measuring or determining, respectively, a conveying speed of the corrugated cardboard web 1 laminated on two sides in the conveying direction 3. Said speed monitoring device 54 is in signal communication with an electronic activation unit.

The printing assembly 49 furthermore has an inkjet printing device 55 which is assigned to the corrugated cardboard web 1 laminated on two sides and is disposed above the latter. The ink jet printing device 55 is disposed downstream of the speed measuring device 54. Said inkjet printing device is in signal communication with the electronic activation unit. The spacing between the ink jet printing device 55 and the speed measuring device 54 is smaller than 1 meter and is known.

The ink jet printing device 55 is capable of printing the corrugated cardboard web 1 laminated on two sides on the external side 48 of the latter, or of printing the continuous first/external cover web of the corrugated cardboard web 1 laminated on two sides, respectively, on account of which the latter is heated in particular at least on the external side. Said ink jet printing device 55 is in particular capable of imprinting at least one imprint on the corrugated cardboard web 1 laminated on two sides, or on the cooled dried pre-coating, respectively. The pre-coating is thus located between the at least one imprint and the actual corrugated cardboard web 1 laminated on two sides. The at least one imprint is preferably a colour imprint. Said at least one imprint is located on the printed side 48 of the corrugated cardboard web 1 laminated on two sides, or on the continuous first/external cover web, respectively.

It is advantageous for the ink jet printing device 55 to have a plurality of printing heads which extend across the width of the corrugated cardboard web 1 laminated on two sides. The printing heads are favourably disposed behind one another in rows in the conveying direction 3.

The printing assembly 49 moreover has a second infrared drying device 56 which is disposed downstream of the ink jet printing device 55 and is assigned to the corrugated cardboard web 1 laminated on two sides. The second infrared drying device 56 extends horizontally and dries the printed corrugated cardboard web 1 laminated on two sides, or the at least one imprint of the latter, respectively, by means of infrared radiation. Said second infrared drying device 56 is preferably capable of reducing any curvature, if present, of the corrugated cardboard web 1 laminated on two sides. The second infrared drying device 56 is disposed above the corrugated cardboard web 1 laminated on two sides.

The printing assembly 49 moreover has a second hot air drying device 57 which is disposed downstream of the second infrared drying device 56 and is assigned to the corrugated cardboard web 1 laminated on two sides. The second hot air drying device 57 further dries the already somewhat dried corrugated cardboard web 1 laminated on two sides, or the already somewhat dried at least one imprint of the latter, respectively, by means of hot air. Said second hot air drying device 57 is preferably capable of reducing any curvature, if present, of the corrugated cardboard web 1 laminated on two sides. The second hot air drying device 57 extends horizontally and is directly downstream of the second infrared drying device 56.

The printing assembly 49 moreover has a plurality of guide tables 78 which in each case extend along the conveying direction 3 and in terms of the conveying direction 3 are disposed behind one another.

The guide tables 78 which are a component part of a guiding device have upwardly facing guide faces 79 for guiding or supporting, respectively, the corrugated cardboard web 1 laminated on two sides. The guide faces 79 are formed from a wear-resistant or low-friction coating, respectively, such as ceramics. The guide faces 79 are heated by heating plates, for example.

The guide tables 78 are disposed below the pre-coating application device 50, the infrared drying device 51, the hot air drying device 52, the cooling device 53, the speed measuring device 54, the ink jet printing device 55, the second infrared drying device 56, and the second hot air drying device 57. A guide gap for the corrugated cardboard web 1 laminated on two sides is thus formed between the guide tables 78 and the devices 50, 51, 52, 53, 54, 55, 56, 57 mentioned.

The guide tables 78 are configured as vacuum tables. Suction openings for suctioning the corrugated cardboard web 1 laminated on two sides are located in the guiding faces 79, said suction openings being flow-connected to vacuum pumps 80 and opening out in a manner adjacent to the corrugated cardboard web 1 laminated on two sides.

The guide tables 78 are curved, in particular in a convex manner, in the conveying direction 3.

A mark reader assembly 81 is disposed below the first hot air drying device 52. The mark reader assembly 81 is disposed between two guide tables 78, so as to be below the corrugated cardboard web 1 laminated on two sides. The mark reader assembly 81 is capable of detecting marks on the continuous lamination web 30. Said mark reader assembly 81 is in signal communication with the electronic activation unit. Alternatively, other reader assemblies can be used.

The corrugated cardboard plant has an imprint synchronization device which is in signal communication with the electronic activation unit. The imprint synchronization device, based on the marks detected on the continuous lamination web 30, is capable of mutually matching the imprint by the ink jet printing device 55 and the corrugated cardboard web 1 laminated on two sides. To this end, the electronic activation unit utilizes in particular the marks detected by the mark reader assembly 81 and the conveying speed of the corrugated cardboard web 1 laminated on two sides, as measured by the speed measuring device 54. The electronic activation unit in a corresponding manner activates an imprint synchronization installation. For example, the ink jet printing device 55 and/or the corrugated cardboard web 1 laminated on two sides are/is capable of being influenced, for example.

The corrugated cardboard plant, downstream of the second hot air drying device 57, has a moisture measuring device 58 which is assigned to the corrugated cardboard web 1 laminated on two sides and is disposed above the latter. The moisture measuring system 58 measures a moisture of the printed corrugated cardboard web 1 laminated on two sides, or of the at least one imprint, respectively. The moisture is optionally modified.

The corrugated cardboard plant furthermore comprises a print layout monitoring installation 59 which is disposed downstream of the moisture measuring device 58 and is disposed above the corrugated cardboard web 1 laminated on two sides. The print layout monitoring installation 59 is capable of monitoring the at least one imprint, or the print layout, respectively, on the corrugated cardboard web 1 laminated on two sides, in particular in terms of the alignment, the quality, and/or the correctness. The print layout is optionally corrected.

The corrugated cardboard plant moreover has a second traction device 60 which is configured in a manner corresponding to that of the first traction device 37 and is disposed downstream of the print layout monitoring installation 59. The second traction device 60 comprises a third traction installation 61 and a fourth traction installation 62, the latter being disposed so as to be adjacent to the third traction installation 61. The third traction installation 61 and the fourth traction installation 62 delimit a second traction gap 63.

The third traction installation 61 has two third guide rollers 64 which are disposed so as to be mutually spaced apart in the conveying direction 3 and run perpendicularly to the conveying direction 3. The third traction installation 61 furthermore has a third traction belt 65 which is guided around the third guide rollers 64. At least one of the third guide rollers 64 is drivable in a rotating manner.

The fourth traction installation 64 is disposed below the third traction installation 61. Said fourth traction installation 64 has two fourth guide rollers 66 which are disposed so as to be mutually spaced apart in the conveying direction 3 and run perpendicularly to the conveying direction 3. The fourth traction installation 62 furthermore has a fourth traction belt 67 which is guided around the fourth guide rollers 66. At least one of the fourth guide rollers 66 is drivable in a rotating manner.

The third traction belt 65 has a third lower belt 68 which extends along the conveying direction 3 and moves along the latter. The fourth traction belt 67 has a fourth upper belt 69 which extends along the conveying direction 3 and so as to be adjacent to the third lower belt 68. The fourth upper belt 69 moves along the conveying direction 3. The third lower belt 68 and the fourth upper belt 69 run so as to be mutually adjacent and spaced apart, while delimiting the second traction gap 63.

The corrugated cardboard web 1 laminated on two sides is guided through the second traction gap 63. The third traction belt 65 and the fourth traction belt 67 in said second traction gap 63 engage in an opposite manner on the corrugated cardboard web 1 laminated on two sides and compress the latter. The second traction device 60 can facilitate a conveyance of the corrugated cardboard web 1 laminated on two sides in the conveying direction 3. Said second traction device 60 can also apply a braking torque or a braking force, respectively, to the corrugated cardboard web 1 laminated on two sides. The second traction device 60 can facilitate a conveyance of the corrugated cardboard web 1 laminated on two sides in the conveying direction 3, this causing an increase in the web tension of the corrugated cardboard web 1 laminated on two sides in the printing assembly 49. Said second traction device 60 can also apply a braking torque or a braking force, respectively, to the corrugated cardboard web 1 laminated on two sides, this causing a reduction in the web tension of the corrugated cardboard web 1 laminated on two sides in the printing assembly.

The corrugated cardboard plant, downstream of the second traction device 60, has a short transverse cutting device 70 which comprises a knife cylinder and a counter cylinder disposed below the latter. The knife cylinder and the counter cylinder are mounted so as to be rotatable or drivable in a rotating manner, respectively. The short transverse cutting device 70 is capable of generating a cut which extends across the full width of the corrugated cardboard web 1 laminated on two sides. To this end, the knife cylinder and the counter cylinder are set in rotation in such a manner that said knife cylinder and said counter cylinder interact in the cutting procedure. The short transverse cutting device 70 is furthermore capable of generating a cut of a specific length and having a specific spacing from a longitudinal periphery of the corrugated cardboard web 1 laminated on two sides. To this end, counter-member elements of the counter cylinder are chosen or adjusted in a corresponding manner, respectively. The knife cylinder and the counter cylinder are set in rotation for the cutting procedure in such a manner that a knife of the knife cylinder interacts with the counter-member elements.

The corrugated cardboard plant, downstream of the short transverse cutting device 70, has a longitudinal cutting/grooving device 71 having two grooving units and two longitudinal cutting units disposed downstream of the latter. The longitudinal cutting units are capable of cutting the corrugated cardboard web 1 laminated on two sides in the conveying direction 3 while forming corrugated cardboard part-webs. The grooving units are capable of grooving the corrugated cardboard web 1 laminated on two sides in order for any later folding to be simplified.

A turnout 72 of the corrugated cardboard plant is provided downstream of the longitudinal cutting/grooving device 71, said turnout 72 being provided for splitting the produced corrugated cardboard part-webs among two different planes.

The corrugated cardboard plant, downstream of the turnout 72, has a transverse cutting device 73 having two partial transverse cutting installations that are disposed on top of one another. Each partial transverse cutting installation has two transverse cutting rollers that are drivable in a rotating manner and are disposed on top of one another, said transverse cutting rollers extending perpendicularly to the conveying direction 3 and having transverse cutting knives that extend radially outwards in order for the respective corrugated cardboard part-web to be completely severed in a transverse manner, while generating the corrugated cardboard sheets 2. The marks detectable by the mark reader assembly 81 are preferably marks which are also used for synchronizing the partial transverse cutting installations.

A conveyor belt 74, 75 on which the corrugated cardboard sheets 2 imprinted on the external side are guided to form a respective stack deposit 76 and 77, respectively, is disposed downstream of each partial transverse cutting installation.

Alternatively to the guide tables 78, conveying installations having drivable conveying elements for conveying the corrugated cardboard web 1 laminated on two sides in the conveying direction 3 in the printing assembly 49 are provided.

Figure 2:
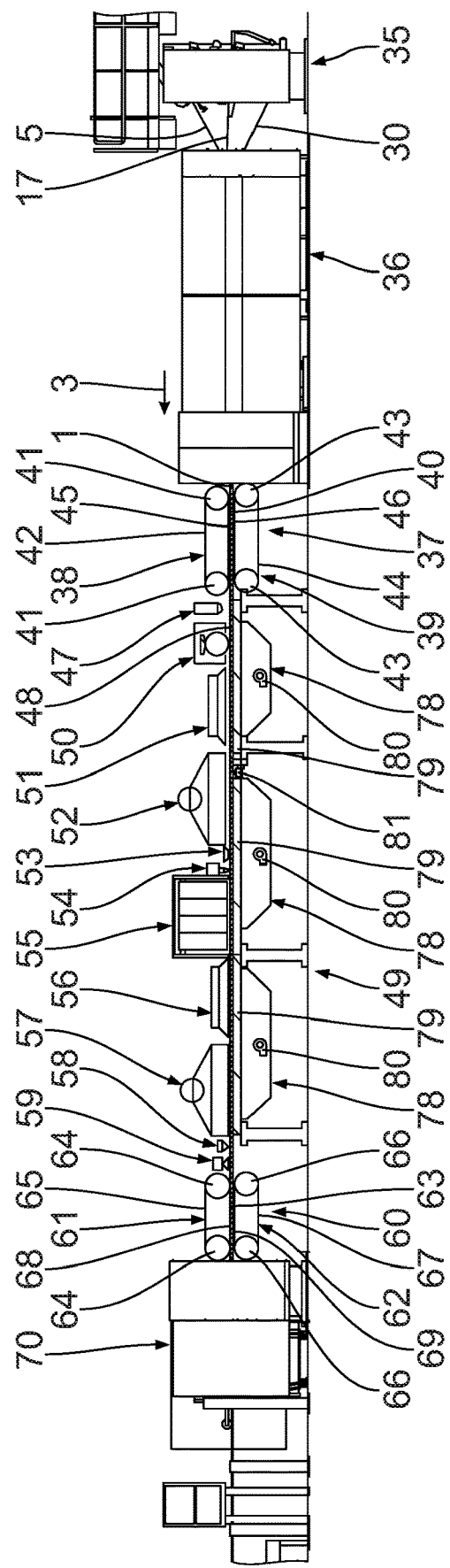
FIG. 2 shows a fragment from FIG. 1, visualizing a printing assembly of the corrugated cardboard plant and adjacent components of the corrugated cardboard plant.
Figure 3:
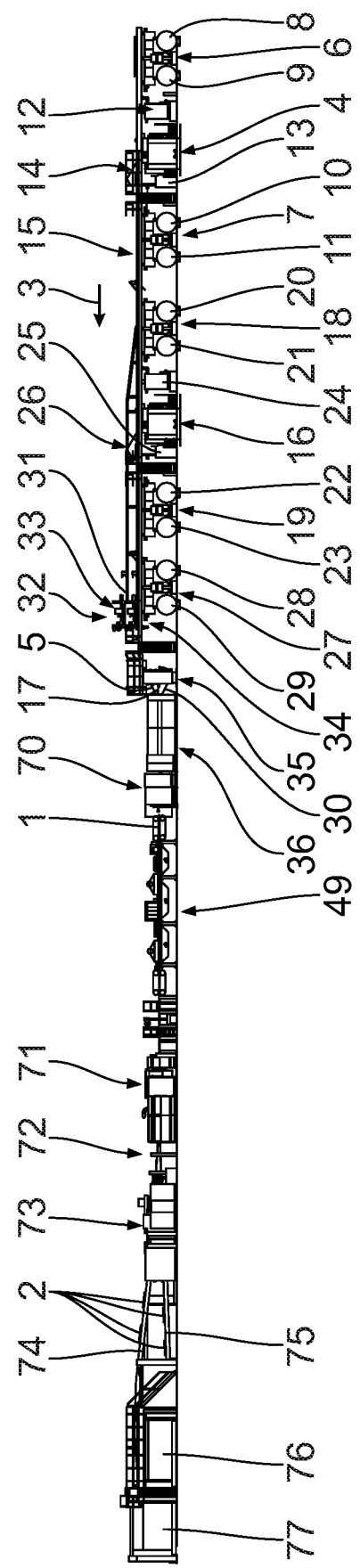
FIG. 3 shows a schematic lateral view of a corrugated cardboard plant according to the invention and according to a second embodiment.
Figure 4:
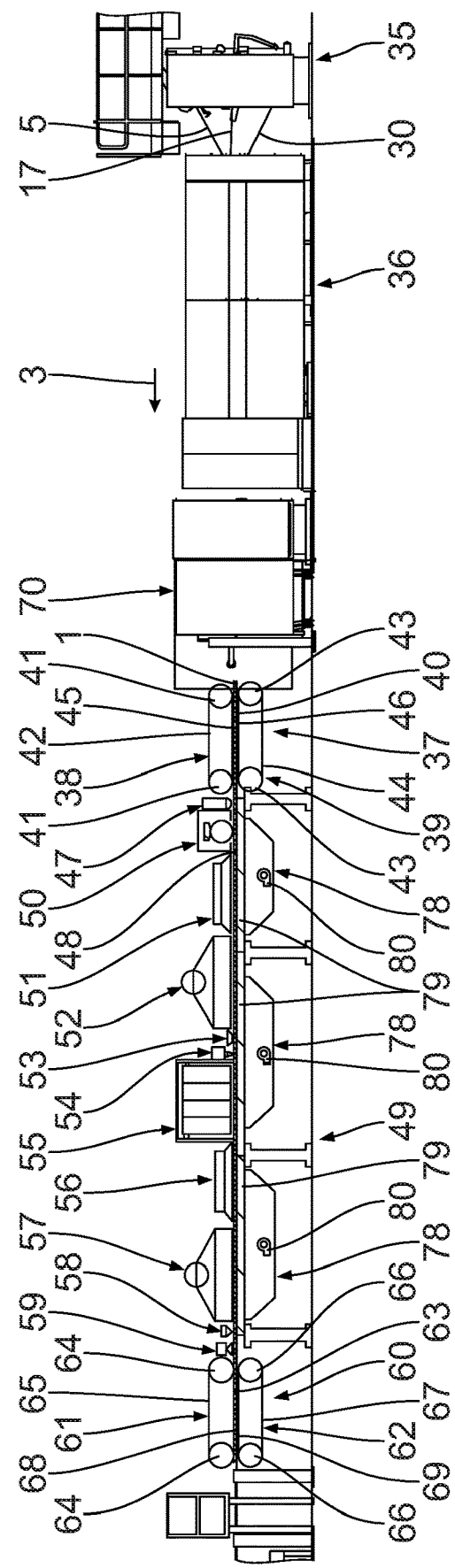
FIG. 4 shows a fragment from FIG. 3, showing the alternative printing assembly of the corrugated cardboard plant and adjacent components of the corrugated cardboard plant.

The second embodiment will be described hereunder with reference to FIGS. 3, 4. As compared to the first embodiment according to FIGS. 1, 2, reference to the description thereof herewith being explicitly made, the short transverse cutting device 70 is disposed upstream of the first traction device 37. The short transverse cutting device 70 is disposed between the first traction device 37 and the compression device 36. Said short transverse cutting device 70 is thus disposed upstream of the printing assembly 49.

It is advantageous herein that the short transverse cutting device 70 diverts defective corrugated cardboard parts already ahead of the ink jet printing device 55, this preventing damage to the ink jet printing device 55.

By contrast, in the case of the first embodiment no new leading abutting edges are however present at the ink jet printing device 55 when defective corrugated cardboard parts are diverted by the short transverse cutting device 70. The short transverse cutting device 70 according to the first embodiment is disposed downstream of the ink jet printing device 55.

Figure 5:
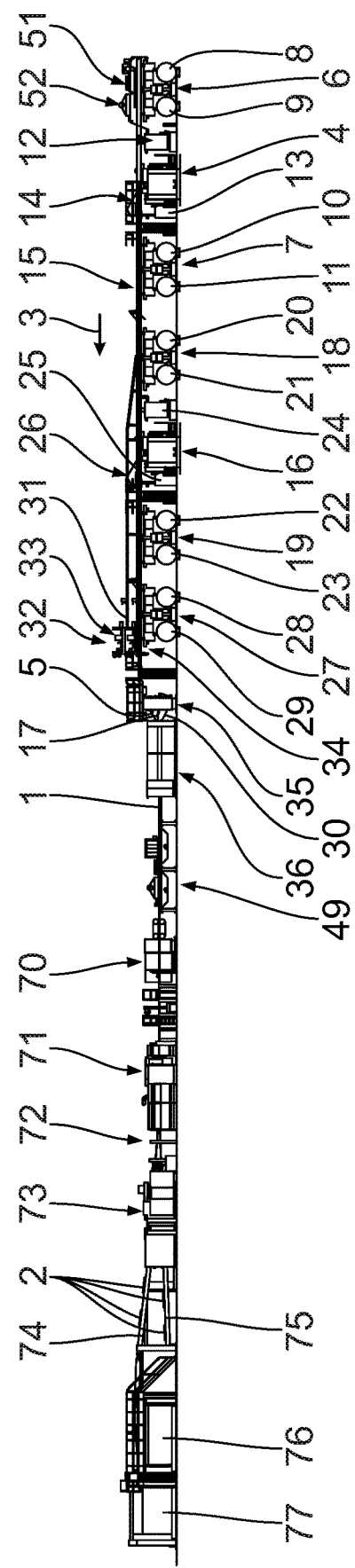
FIG. 5 shows a schematic lateral view of a corrugated cardboard plant according to the invention and according to a third embodiment.
Figure 6:
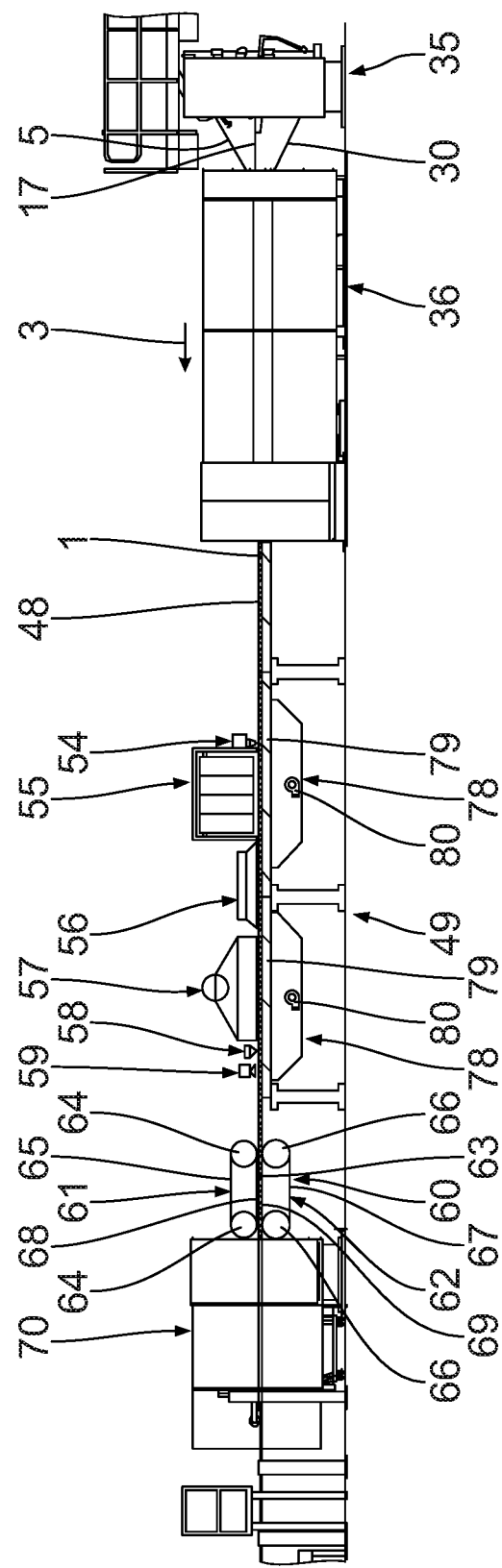
FIG. 6 shows a fragment from FIG. 5, showing the alternative printing assembly of the corrugated cardboard plant and adjacent components of the corrugated cardboard plant.
Figure 7:
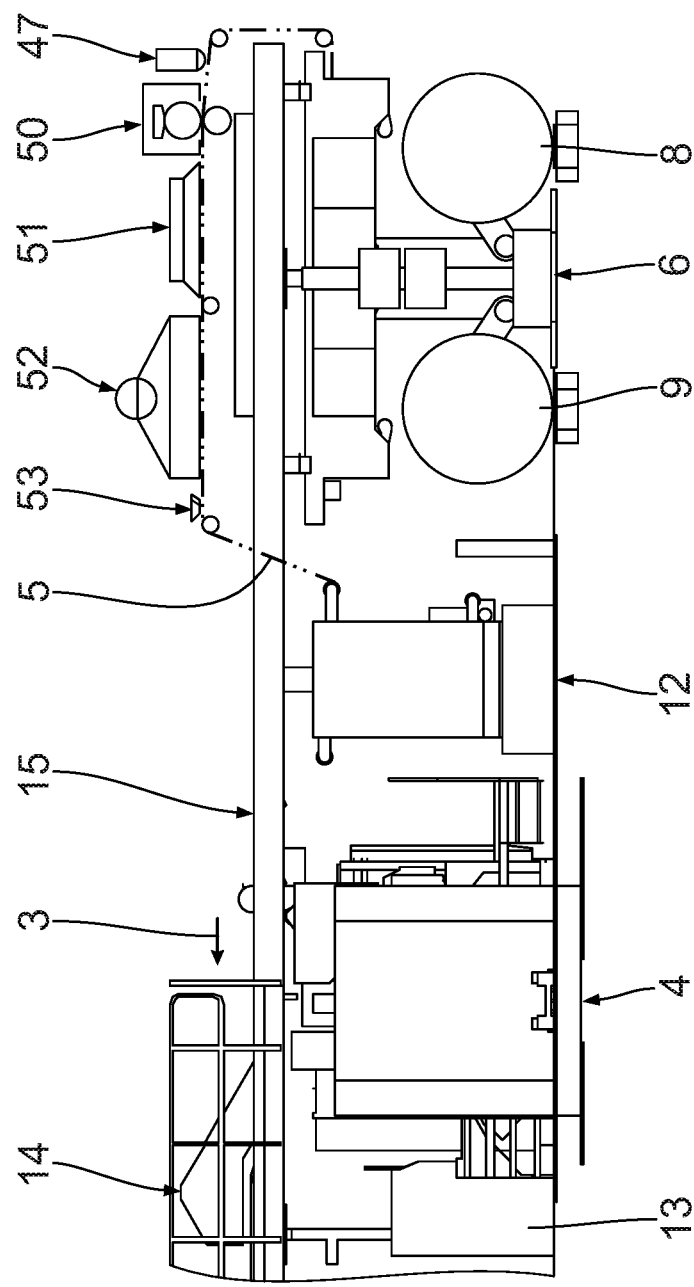
FIG. 7 shows a fragment from FIG. 5, visualizing an upstream coating of the cover web to be printed of the corrugated cardboard web laminated on two sides.

A third embodiment will be described hereunder with reference to FIGS. 5 to 7. As compared to the first embodiment, reference to the description thereof herewith being explicitly made, the first separate traction device 37 is omitted in the case of this embodiment.

The inspection assembly 47, the pre-coating application device 50, the infrared drying device 51, and the hot air drying device 52, and the cooling device 53 in the case of this embodiment are no longer disposed downstream of the compression device 36 but are disposed between the first cover web splicing device 6 and the first device 4 for producing a first corrugated cardboard web 5 laminated on one side. Said inspection assembly 47, the pre-coating application device 50, the infrared drying device 51, the hot air drying device 52, and the cooling device 53 are disposed above the first cover web splicing device 6 and are assigned to the continuous first cover web such that the continuous first cover web by means of the inspection assembly 47 is already inspected ahead of the first device 4 for producing a first corrugated cardboard web 5 laminated on one side and is precoated in a planar manner by means of the pre-coating application device 50. The pre-coated continuous first cover web is dried in the infrared drying device 51 and hot air drying device 52 and is cooled in the cooling device 53. Said pre-coated continuous first cover web is then guided into the first device 4 for producing a first corrugated cardboard web 5 laminated on one side.

The pre-coating application device 50, the first infrared drying device 51, the hot air drying device 52, and the cooling device 53 form a pre-coating assembly.

The first traction device 37 is absent in the case of this embodiment. The compression device 36 ensures the required web tension of the corrugated cardboard web 1 laminated on two sides in the printing assembly 49. Said compression device 36 assumes the function of the first traction device 37 of the previous embodiments.

Figure 8:
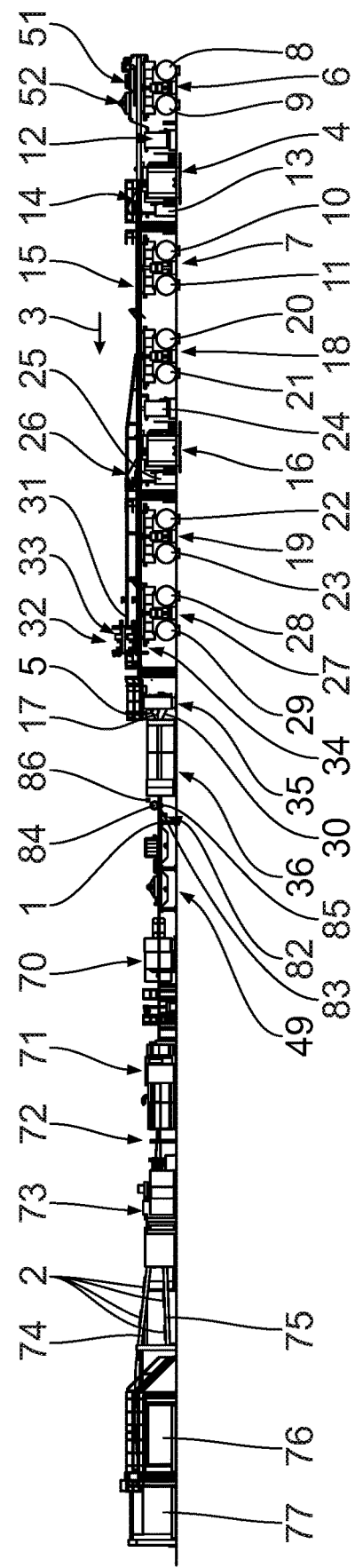
FIG. 8 shows a schematic lateral view of a corrugated cardboard plant according to the invention and according to a fourth embodiment.

A fourth embodiment will be described hereunder with reference to FIG. 8. As compared to the third embodiment, reference to the description thereof herewith being explicitly made, a peripheral trimming device 82 is disposed between the compression device 36 and the ink jet printing device 55 in this embodiment, said peripheral trimming device 82 being assigned to the corrugated cardboard web 1 laminated on two sides and having a peripheral strip discharge installation 83 for discharging severed peripherals strips of the corrugated cardboard web 1 laminated on two sides, said peripheral strip discharge installation 83 being configured as a vacuum bag.

The peripheral trimming device 82 has at least one upper brush roller 84 and lower circular knife 85, the rotation axis of the latter running perpendicularly to the conveying direction of the corrugated cardboard web 1 laminated on two sides. The corrugated cardboard web 1 laminated on two sides is guided through between the at least one brush roller 84 and the at least one circular knife 85. In peripheral trimming at least one circular knife 85 is active while generating at least one peripheral strip. Said circular knife 85 then engages in a cutting manner in the corrugated cardboard web 1 laminated on two sides.

A print layout detection assembly 86 is disposed between the compression device 36 and the peripheral trimming device 82, said print layout detection assembly 86 being assigned to the corrugated cardboard web 1 laminated on two sides and detecting the printed regions or print layouts, respectively, of the latter. The print layout detection assembly 86 is in signal communication with the longitudinal cutting/grooving device 71 in order for the latter to be activated. The longitudinal cutting/grooving device 71 is activated in such a manner that the printed regions or print layouts remain undamaged.

What is claimed is:

1. A corrugated cardboard plant for producing corrugated cardboard, the corrugated cardboard plant comprising:
   at least one device for producing a respective corrugated cardboard web laminated on one side, from a respective cover web and a respective material web;
   a lamination web dispensing device for dispensing a lamination web;
   a device for producing a corrugated cardboard web laminated on two sides from the respective corrugated cardboard web laminated on one side and from the lamination web, said device for producing a corrugated cardboard web laminated on two sides being disposed downstream of the lamination web dispensing device and of the at least one device for producing a respective corrugated cardboard web laminated on one side, and having at least one compression section;
   a printing assembly having at least one digital printing device for printing the corrugated cardboard web laminated on two sides, said printing assembly being disposed downstream of the device for producing a corrugated cardboard web laminated on two sides;
   a traction assembly for influencing a web tension of the corrugated cardboard web laminated on two sides in the printing assembly, said traction assembly being disposed so as to be adjacent to the at least one digital printing device; and
   a transverse cutting device disposed downstream of the printing assembly, for transversely cutting the corrugated cardboard web laminated on two sides, while forming corrugated cardboard sheets, the printing assembly comprising a vacuum guiding device for guiding the corrugated cardboard web laminated on two sides, the vacuum guiding device comprising at least one guide table for guiding the corrugated cardboard web laminated on two sides, wherein the at least one guide table has a guiding face which for facilitating a compression of the corrugated cardboard web laminated on two sides against the at least one guide table is curved at least in regions, wherein a curvature radius of the curved guiding face is at least 2.5 meters.

2. The corrugated cardboard plant according to claim 1, wherein the traction assembly comprises a first traction device which is disposed upstream of the at least one digital printing device.

3. The corrugated cardboard plant according to claim 1, wherein the traction assembly comprises a second traction device which is disposed downstream of the at least one digital printing device.

4. The corrugated cardboard plant according to claim 2, wherein the first traction device comprises at least one drivable traction element, and at least one counter element that is assigned to the at least one drivable traction element so as to delimit at least one traction gap for guiding therebetween the corrugated cardboard web laminated on two sides.

5. The corrugated cardboard plant according to claim 3, wherein the second traction device comprises at least one drivable traction element, and at least one counter element that is assigned to the at least one drivable traction element so as to delimit at least one traction gap for guiding therebetween the corrugated cardboard web laminated on two sides.

6. The corrugated cardboard plant according to claim 1, wherein the printing assembly is disposed upstream of a longitudinal cutting/grooving device for at least one of longitudinally cutting and grooving the corrugated cardboard web laminated on two sides.

7. The corrugated cardboard plant according to claim 1, wherein a short transverse cutting device is disposed upstream of the printing assembly.

8. The corrugated cardboard plant according to claim 1, wherein a short transverse cutting device is disposed downstream of the printing assembly.

9. The corrugated cardboard plant according to claim 1, wherein the printing assembly comprises an imprint synchronization assembly for synchronizing imprinting by the at least one digital printing device with the corrugated cardboard web laminated on two sides.

10. The corrugated cardboard plant according to claim 9, wherein the imprint synchronization assembly comprises at least one reader assembly for reading synchronization information on the corrugated cardboard web laminated on two sides.

11. The corrugated cardboard plant according to claim 1, wherein the printing assembly has a web speed measuring device for measuring a conveying speed of the corrugated cardboard web laminated on two sides, wherein the web speed measuring device is disposed upstream of the at least one digital printing device.

12. The corrugated cardboard plant according to claim 11, wherein the web speed measuring device is disposed so as to be adjacent to said digital printing device, and is in signal communication with an activation unit for synchronizing imprinting by the at least one digital printing device with the corrugated cardboard web laminated on two sides.

13. The corrugated cardboard plant according to claim 1, wherein the vacuum guiding device comprises at least one heating installation for heating the corrugated cardboard web laminated on two sides.

14. The corrugated cardboard plant according to claim 1, wherein the at least one guide table in a guiding face thereof comprises at least one suction opening for suctioning the corrugated cardboard web laminated on two sides to the at least one guide table.

15. The corrugated cardboard plant according to claim 1, wherein the at least one digital printing device is displaceable between a printing position and a parking position.

16. The corrugated cardboard plant according to claim 15, wherein the parking position is laterally beside the corrugated cardboard web laminated on two sides.

17. The corrugated cardboard plant according to claim 1, further comprising a pre-coating assembly for pre-coating a web to be printed, wherein the pre-coating assembly is disposed upstream of the device for producing a respective corrugated cardboard web laminated on one side having the pre-coated web.

18. The corrugated cardboard plant according to claim 1, further comprising a peripheral trimming device disposed upstream of the at least one printing device, for trimming the edges of the corrugated cardboard web laminated on two sides.

19. The corrugated cardboard plant according to claim 6, further comprising a print layout detection assembly for activating the longitudinal cutting/grooving device, said print layout detection assembly being disposed between the longitudinal cutting/grooving device and a peripheral trimming device disposed upstream of the at least one printing device, for trimming the edges of the corrugated cardboard web laminated on two sides.

20. The corrugated cardboard plant according to claim 1, further comprising the respective gluing unit for applying glue to free tips of at least one corrugated cardboard web laminated on one side for connecting the respective corrugated cardboard web laminated on one side in a glued manner to the lamination web for forming a corrugated cardboard web laminated on two sides, wherein the glue for bonding and drying on the at least one corrugated cardboard web laminated on one side permits processing temperatures of below 70° C.

21. A method for producing corrugated cardboard, the method comprising the steps of:
providing corrugated cardboard plant comprising:
a respective device for producing at least one corrugated cardboard web laminated on one side, from a respective cover web and a respective material web;
a lamination web dispensing device for dispensing a lamination web;
a device for producing a corrugated cardboard web laminated on two sides from the respective corrugated cardboard web laminated on one side and from the lamination web, said device for producing the corrugated cardboard web laminated on two sides being disposed downstream of the lamination web dispensing device and of the at least one device for producing a respective corrugated cardboard web laminated on one side, and having at least one compression section;
a printing assembly having at least one digital printing device for printing the corrugated cardboard web laminated on two sides, said printing assembly being disposed downstream of the device for producing the corrugated cardboard web laminated on two sides;
a traction assembly for influencing a web tension of the corrugated cardboard web laminated on two sides in the printing assembly, said traction assembly being disposed so as to be adjacent to the at least one digital printing device;
a gluing unit;
a transverse cutting device disposed downstream of the printing assembly, for transversely cutting the corrugated cardboard web laminated on two sides, while forming corrugated cardboard sheets, the printing assembly being disposed upstream of a longitudinal cutting/grooving device for at least one of longitudinally cutting and grooving the corrugated cardboard web laminated on two sides; and
a print layout detection assembly for activating the longitudinal cutting/grooving device, said print layout detection assembly being disposed between the longitudinal cutting/grooving device and a peripheral trimming device disposed upstream of the at least one printing device, for trimming the edges of the corrugated cardboard web laminated on two sides;
using the corrugated cardboard plant to produce corrugated cardboard including applying glue by the gluing unit to free tips of the respective corrugated cardboard web laminated on one side for connecting the respective corrugated cardboard web laminated on one side in a glued manner to the lamination web for forming the corrugated cardboard web laminated on two sides, wherein the glue permits processing temperatures of below 70° C.

22. A corrugated cardboard plant for producing corrugated cardboard, the corrugated cardboard plant comprising:
at least one device for producing a respective corrugated cardboard web laminated on one side, from a respective cover web and a respective material web;
a lamination web dispensing device for dispensing a lamination web;
a device for producing a corrugated cardboard web laminated on two sides from the respective corrugated cardboard web laminated on one side and from the lamination web, said device for producing a corrugated cardboard web laminated on two sides being disposed downstream of the lamination web dispensing device and of the at least one device for producing a respective corrugated cardboard web laminated on one side, and having at least one compression section;
a printing assembly having at least one digital printing device for printing the corrugated cardboard web laminated on two sides, said printing assembly being disposed downstream of the device for producing a corrugated cardboard web laminated on two sides;
a traction assembly for influencing a web tension of the corrugated cardboard web laminated on two sides in the printing assembly, said traction assembly being disposed so as to be adjacent to the at least one digital printing device;
a transverse cutting device disposed downstream of the printing assembly, for transversely cutting the corrugated cardboard web laminated on two sides, while forming corrugated cardboard sheets, the printing assembly being disposed upstream of a longitudinal cutting/grooving device for at least one of longitudinally cutting and grooving the corrugated cardboard web laminated on two sides; and a print layout detection assembly for activating the longitudinal cutting/grooving device, said print layout detection assembly being disposed between the longitudinal cutting/grooving device and a peripheral trimming device disposed upstream of the at least one printing device, for trimming the edges of the corrugated cardboard web laminated on two sides.

* * * * *